UNITED STATES PATENT OFFICE.

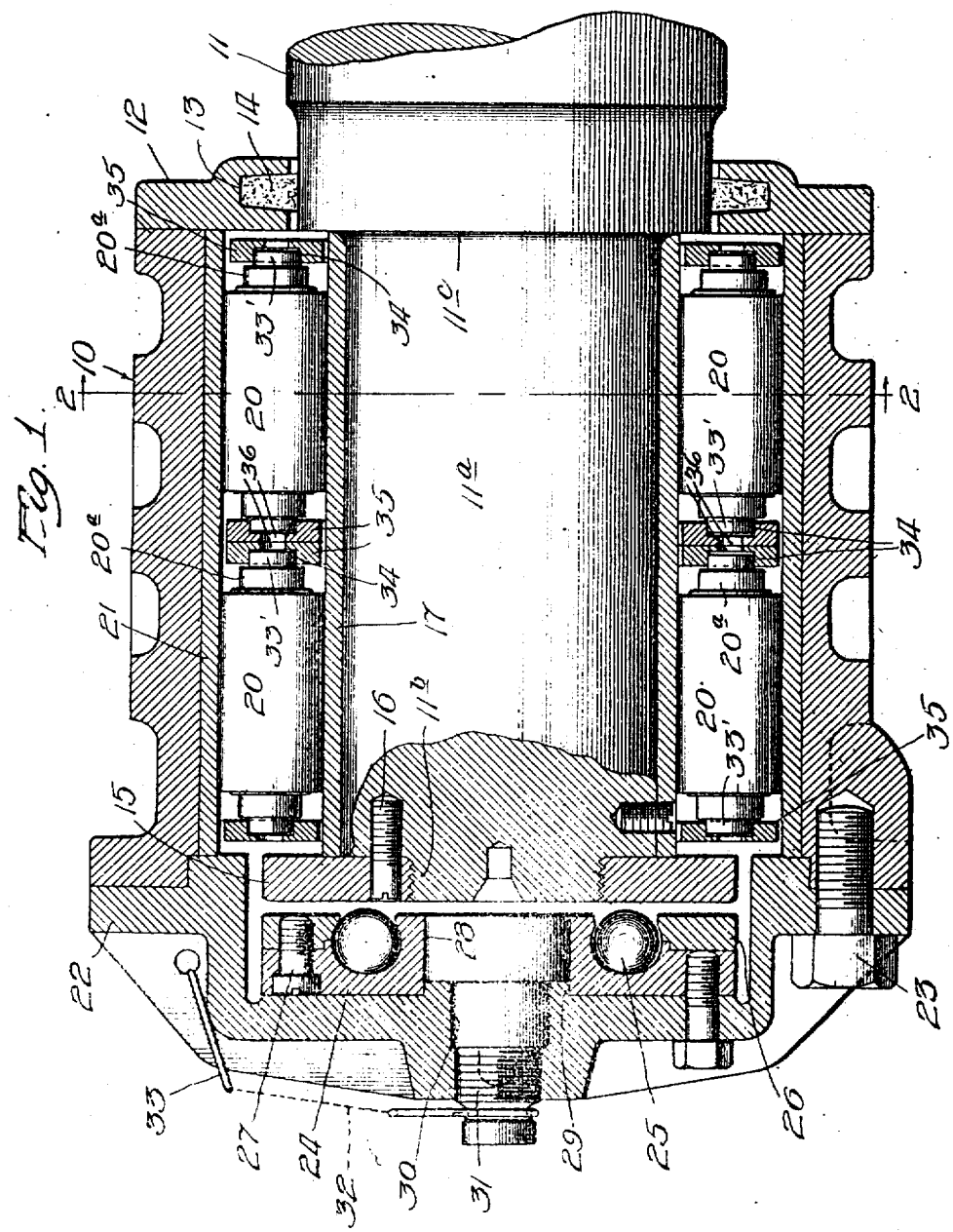

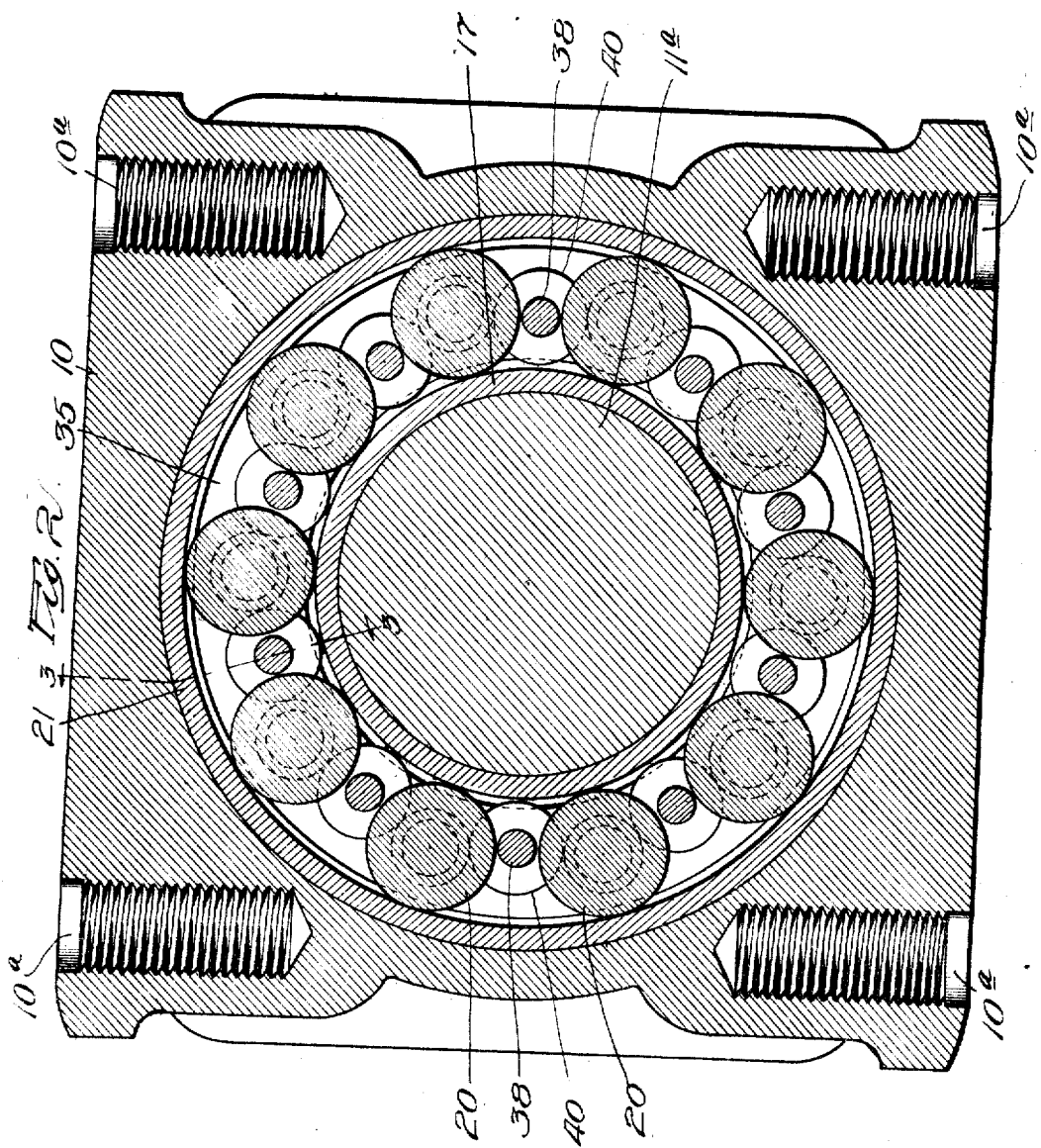

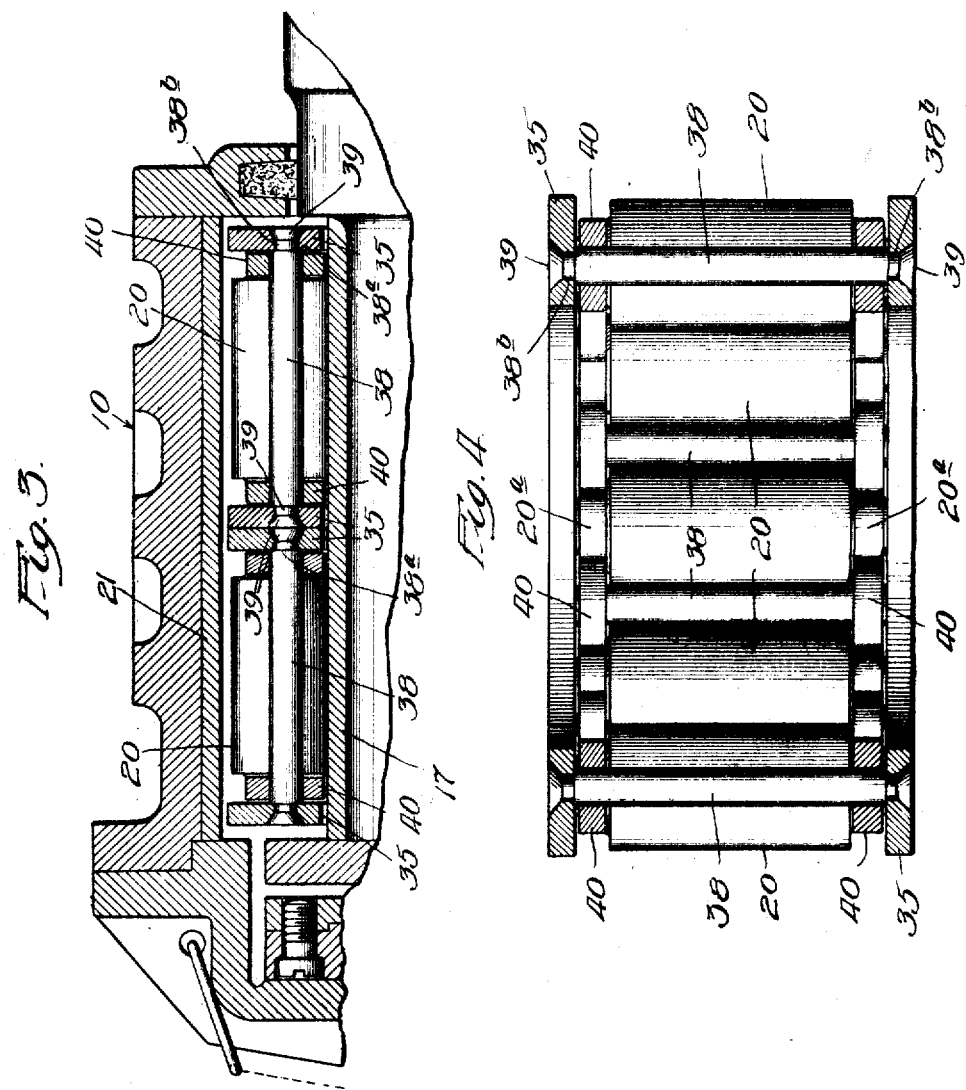

EDWARD POSSON, OF CHICAGO, ILLINOIS.

ROLLER-BEARING JOURNAL.

1,406,279.

Specification of Letters Patent.   Patented Feb. 14, 1922.

Application filed September 18, 1919.   Serial No. 324,570.

*To all whom it may concern:*

Be it known that I, EDWARD POSSON, a citizen of the United States, residing at Chicago, in the county of Cook and State of Illinois, have invented certain new and useful Improvements in Roller-Bearing Journals, of which the following is a specification.

This invention relates to a journal bearing for railway cars, and its purpose is to provide an improved journal box comprising roller bearings adapted to coact with the axle of the car truck. An important feature of the invention is the provision of improved means for mounting the roller bearings which are separated by annular retainers extending around the axle. A further object is to provide improved means for separating the rollers and reducing the friction thereof on the retainers. Other objects relate to various features of construction and arrangement which will appear more fully hereinafter.

The nature of the invention will be understood from the following specification, taken with the accompanying drawings, in which one embodiment is illustrated.

In the drawings—

Figure 1 shows a longitudinal sectional view through a journal box embodying the invention;

Fig. 2 shows a vertical transverse sectional view on the line 2—2 of Fig. 1;

Fig. 3 shows a partial longitudinal sectional view on the line 3—3 of Fig. 2, illustrating the method of mounting the spacing rollers and of connecting the annular retaining rings; and Fig. 4 is a transverse sectional view through the retaining rings showing the connecting pins and the rollers in elevation.

The construction illustrated in the drawings comprises a hollow journal box 10 provided with threaded apertures 10$^a$ by means of which a connection is made between the journal box and the car truck. The car axle 11 extends into the journal box from the inner end thereof, and the inner end of the box is closed by an end wall 12 which is secured thereto and which is provided with an annular recess 13 adapted to contain packing material 14 which coacts with the periphery of the car axle and prevents dirt and other materials from entering the interior of the box. The inner bearing portion 11$^a$ of the car axle, which is reduced in diameter, has an extremity 11$^b$ of still smaller diameter which is threaded externally and adapted to receive the threaded collar 15. This collar is of larger diameter than the axle and is held against rotation by means of set screws 16 which engage apertures therein and enter threaded recesses in the end of the axle. A case-hardened bushing 17 is pressed onto the portion 11$^a$ of the axle between the collar 15 and the shoulder 11$^c$ at the other end thereof, and this bushing coacts with the cylindrical roller-bearings 20 which are interposed between it and a similar case-hardened bushing 21 of larger diameter which is pressed into the journal box 10 and held in position between the end wall 12 and the other end wall 22 which closes the outer end of the journal box. The end wall 22 is secured to the journal box by means of the studs 23 and it carries on its inner side a circular collar or disk 24 having an annular groove adapted to contain the ball-bearings 25. These balls are secured in the raceway by a complementary annular ring 26 which is removably attached to the collar 24 by means of the cap screws 27. The collar 24 is provided with a central aperture 28 which seats upon the annular shoulder 29 formed on the inner side of the end wall 22, and the aperture 28 in the collar communicates with an aperture 30 in the end wall, which latter aperture is normally closed by a screw-threaded plug 31 which is permanently attached to the journal box by a flexible connection 32 attached to the ring 33. The plug 31 is intended to permit the insertion of hard oil or grease into the interior of the journal box.

The cylindrical roller bearings 20 are provided with reduced end portions 20$^a$, and these end portions are turned down to form projecting trunnions 33' of smaller diameter which are adapted to rotate in the cylindrical recesses 34 formed on the oppositely disposed faces of the annular retainer rings 35 which extend around the part 11$^a$ of the axle. The retaining rings are provided with small apertures 36 which communicate with the recesses 34 to permit the insertion of a tool for driving the trunnions 33' from their seats. Two sets of roller bearings 20 are provided, there being ten rollers in each set, as illustrated in the drawings, and the rollers of each group are mounted between two pairs of retaining rings 35.

These retaining rings are of a diameter slightly larger than that of the steel bushing 17, and they are held outwardly therefrom by the rollers 20, which are larger in diameter than the radial width of the retaining rings.

The retaining rings of each set of rollers are connected together and held in the proper spaced relation by the transverse connecting rods or pins 38, which are provided with shoulders 38ᵃ at their ends adapted to seat against the inner faces of the rings and with reduced portions 38ᵇ which engage apertures in the rings, and are riveted at their ends into the counter-bored portions 39 of the apertures which extend through the rings. A spacing roller 40 is mounted on each pin 38 at each end thereof. These spacing rollers are adapted to rotate on the pins between the rollers and the retaining rings and they are mounted between the reduced portions 20ᵃ of the rollers, as illustrated particularly in Figs. 2 and 4. The spacing rollers 40 are smaller in diameter than the bearing rollers 20, and the pins 38 which serve as bearings for the spacing rollers are mounted with their centers on the arc of a circle which is smaller in diameter than the circle containing the center lines of the axes of the rollers 20, so that the spacing rollers are located inwardly with respect to the bearing rollers 20 and are in direct lines between the centers of the roller bearings, as illustrated in Fig. 2, thus materially reducing the outward thrust on the spacing rollers and the pins.

It will be apparent that the foregoing construction provides an anti-friction roller bearing device between the axle and the journal box, so that the friction between these parts is reduced to a minimum and at the same time the necessary endwise movement of the axle is permitted without causing unnecessary wear or friction by reason of the fact that some relative movement of the roller bearings is permitted longitudinally of the axle between the shoulder 11ᶜ of the axle and the collar 15. The end thrusts of the axle are received by the ball-bearings 25 carried by the end wall 22.

Although I have described one embodiment of the invention for purposes of illustration, it will be understood that it may be constructed in various other forms without departing from the scope of the appended claims.

I claim:

1. In combination, a journal box having an end wall, an axle extending into said box and terminating opposite said end wall, a plate secured to said end wall, a roller bearing carried by said plate and adapted to coact with the end of said axle, said end wall and said plate having centrally located apertures therethrough, and a removable block adapted to close the aperture in said end wall.

2. In combination, a journal box, an axle extending into said journal box, retaining rings extending around said axle, rollers having trunnions journalled in said retaining rings, spacing rods uniting said retaining rings between said rollers, said spacing rods being out of contact with said rollers and being located in planes containing the center lines of adjacent rollers, and spacing rollers rotatably mounted on said spacing rods at the ends of said first named rollers.

3. In combination, a journal box, an axle extending into said journal box, retaining rings extending around said axle, rollers having reduced cylindrical end portions and trunnions extending from said end portions to engage said retaining rings, spacing rods connecting said retaining rings between said rollers, said spacing rods being out of contact with said rollers and being located in planes containing the center lines of adjacent rollers, and spacing rollers rotatably mounted on the ends of said spacing rods and coacting with the peripheral surfaces of the reduced end portions of said first named rollers, said spacing rollers being out of contact with the bearing surface of said axle.

4. In combination, a journal box, an axle having a reduced bearing portion extending into said journal box, a bearing sleeve mounted on said axle, a collar secured directly to the end of said axle and projecting beyond the outer surface of said bearing sleeve, two pairs of retaining rings extending around said bearing sleeve between said collar and the shoulder at the end of said reduced portion, two series of bearing rollers, each series being mounted between the retaining rings of one pair, said bearing rollers having cylindrical end portions of reduced diameter and trunnions engaging said retaining rings, spacing rods located between adjacent bearing rollers and uniting the retaining rings of each pair, said spacing rods being out of contact with said bearing rollers, and spacing rollers journalled on said spacing rods and coacting with the reduced end portions of said bearing rollers, said spacing rollers being out of contact with the outer surface of said bearing sleeve.

In testimony whereof, I have subscribed my name.

EDWARD POSSON.